United States Patent [19]

Petersen

[11] Patent Number: 4,772,217
[45] Date of Patent: Sep. 20, 1988

[54] PRESSURE SENSOR CONNECTOR SYSTEM
[75] Inventor: Richard W. Petersen, Utica, Mich.
[73] Assignee: Augat Inc., Attleboro, Mass.
[21] Appl. No.: 68,229
[22] Filed: Jun. 30, 1987
[51] Int. Cl.$^4$ ............................................. H01R 13/52
[52] U.S. Cl. ................................... 439/278; 439/736; 439/587; 73/753; 73/756
[58] Field of Search ................. 439/271–283, 439/586, 587, 588, 589, 592, 620, 736, 695, 696, 701, 712, 733, 913; 338/2, 4, 3; 73/756, 753, 754, 721, 722, 727, 728, DIG. 4

[56] References Cited
U.S. PATENT DOCUMENTS

| 4,295,117 | 10/1981 | Lake et al. | 73/721 |
| 4,414,851 | 11/1983 | Maglic | 73/756 |
| 4,573,754 | 3/1986 | Hill | 439/280 |
| 4,656,454 | 4/1987 | Rosenberger | 338/4 |
| 4,665,088 | 5/1987 | Adams | 73/756 |

Primary Examiner—David Pirlot
Attorney, Agent, or Firm—Weingarten, Schurgin, Gagnebin & Hayes

[57] ABSTRACT

An electrical connector system for a pressure sensor which can be sealed to a pressure source and sealed from the environment. The connector system comprises an electrical lead assembly molded into a unitary housing which has integral seals for sealed mating with a cooperative connector housing and for sealed coupling to a positive or negative pressure source.

9 Claims, 6 Drawing Sheets

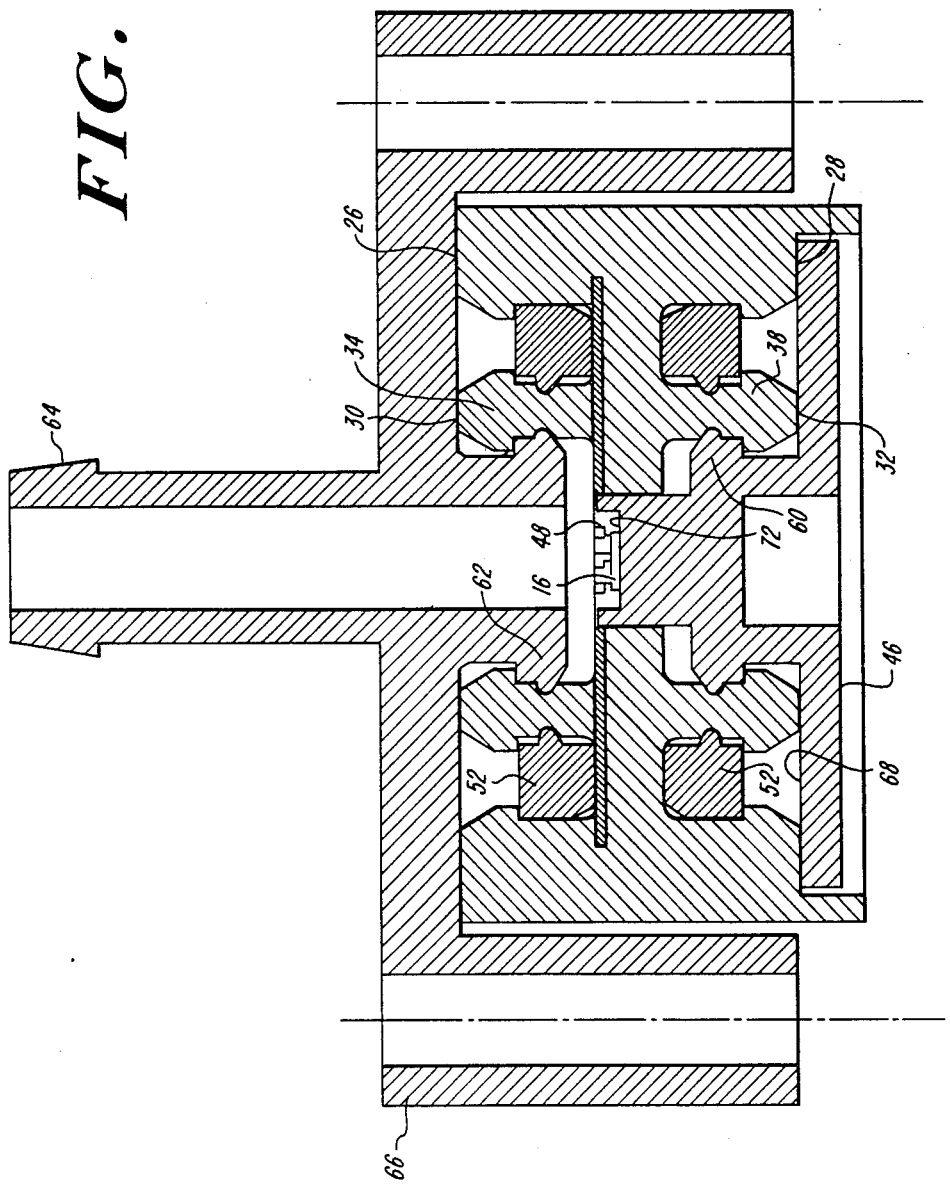

PRESSURE SENSOR CONNECTOR SYSTEM

FIELD OF THE INVENTION

This invention relates to electrical connectors and more particularly to a connector system sealed from the environment and adapted for coupling to a pressure source.

BACKGROUND OF THE INVENTION

Pressure sensors are known for producing electrical signals in response to applied pressure. The sensors are often in the form of piezoelectric or other transducers embodied in an electronic chip which must be contained within a suitable housing which is exposed to the pressure source and which has electrical leads for connection to associated electronic circuitry. The circuitry can provide an indication of applied pressure or provide intended signal functions in response to sensed pressure. The pressure sensors are often used in an environment containing dirt and other contaminants and from which the sensor and its electrical connections should be isolated to prevent malfunction or degradation in performance. A particular application for pressure sensors is in automobiles and other vehicles in which such sensors are employed in pressure and vacuum lines of the vehicle control systems. The environment under the hood or chassis of an automobile, truck or other vehicle is subject to dirt, moisture, fuel, vapor and other contamination, all likely to be deleterious to the proper electrical performance of the sensor and its electrical connections. The sensor should therefore be housed in a manner isolated from the environment. Housings for electrical connectors and the like are known for isolating the connector from the environment, but such sealed housings usually contain separate discrete sealing elements such as gaskets or sealing rings which must be carefully assembled on the housing to provide intended sealing operation. These discrete elements can be lost or damaged when the housing is disassembled, and the reassembly of such components is time consuming and often delicate, especially for connectors of small size.

SUMMARY OF THE INVENTION

The present invention provides an electrical connector for a pressure sensor which can be sealed to a positive or negative pressure source and which is sealed from the environment by a connector system which is of unitary construction having seals integral with the housing. Electrical leads are molded into a unitary housing of elastomeric material which has integral seals provided therewith for sealed mating with a cooperative electrical connector and for sealed coupling to a pressure source. The electrical leads are preferably provided in the form of a lead frame which is insert molded into the housing, with unwanted portions of the frame being later separated to provide individual electrical leads. A cavity is provided within the housing and in which a sensor element is mounted and electrically connected to the electrical leads. The cavity is in sealed coupling relationship with a pressure fitting which is adapted for connection to a positive or negative pressure source, as required to suit particular operating requirements.

DESCRIPTION OF THE DRAWING

The invention will be more fully understood from the following detailed description taken in conjunction with the accompanying drawings, in which:

FIG. 4 is a sectional elevation view of a connector system in accordance with the invention and including the connector of FIG. 1;

DETAILED DESCRIPTION OF THE INVENTION

Figure 1:
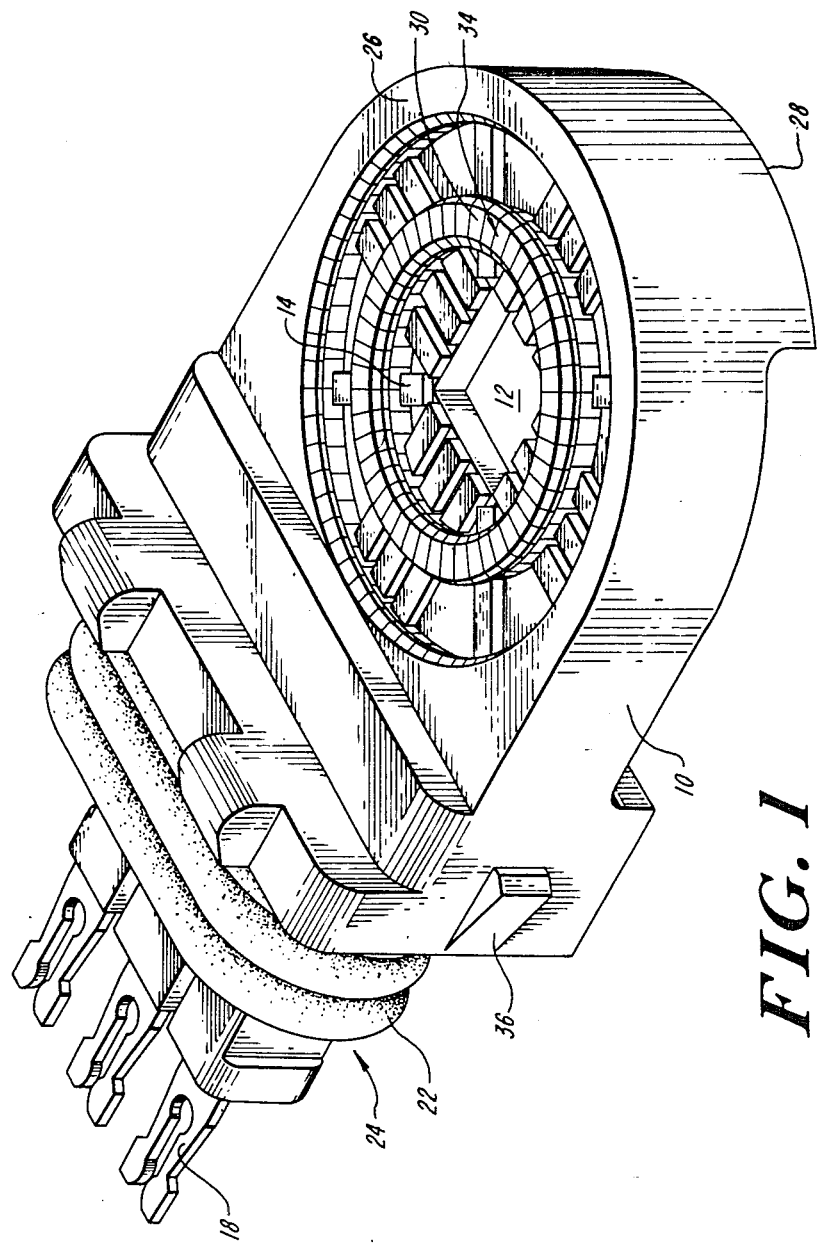
FIG. 1 is a pictorial view of a connector in accordance with the invention.
Figure 2:
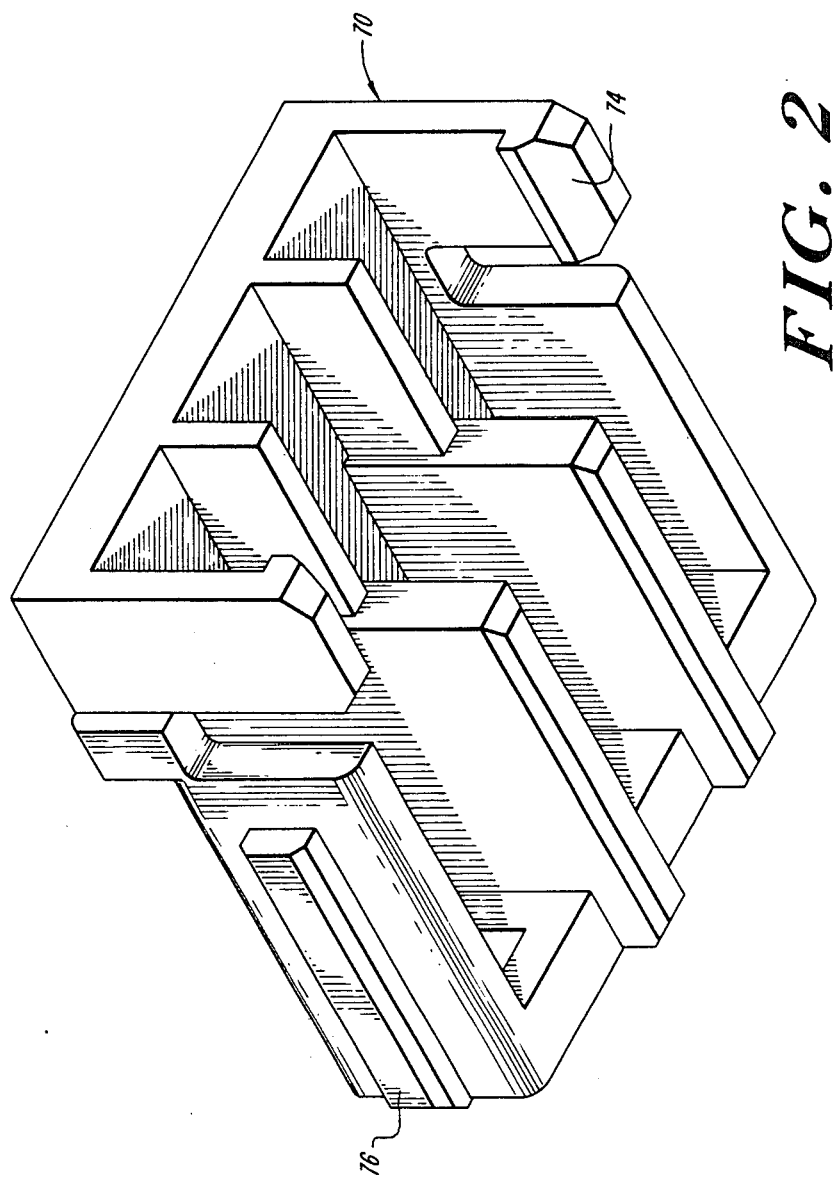
FIG. 2 is a pictorial view of an index housing useful with the connector of FIG. 1.

Referring to the drawings, there is shown a connector housing 10 which is integrally molded of an elastomeric material having a central cavity 12 and a plurality of electrical leads 14 around the cavity into which a pressure sensing element 16 (FIG. 4) is mechanically and electrically attached. The leads are part of a lead assembly insert molded into the housing. The lead assembly includes outwardly extending external leads 18 for connection to a mating connector. The number of external leads 18 is determined to suit the requirements of the particular sensing element. A seal 22 is integrally provided on the housing 10 and surrounds the end portion 24 from which the leads extend. The seal 22 is mateable with a confronting surface or similar seal of a mating connector to provide an interconnection sealed from the environment. This integral seal in the illustrated embodiment is in the form of a bellows-like structure which is yieldable to provide sealing engagement with a confronting surface of a mating connector. The top peripheral surface 26 of the cavity and the bottom peripheral surface 28 of the cavity serve as integral sealing surfaces, as do the top surface 30 and the bottom surface 32 of the integral rings 34 within the cavity area. The unitary housing also includes latch tabs 36 which are cooperative with latch elements of a mating connector housing to lock the mated housings together.

Figure 6:
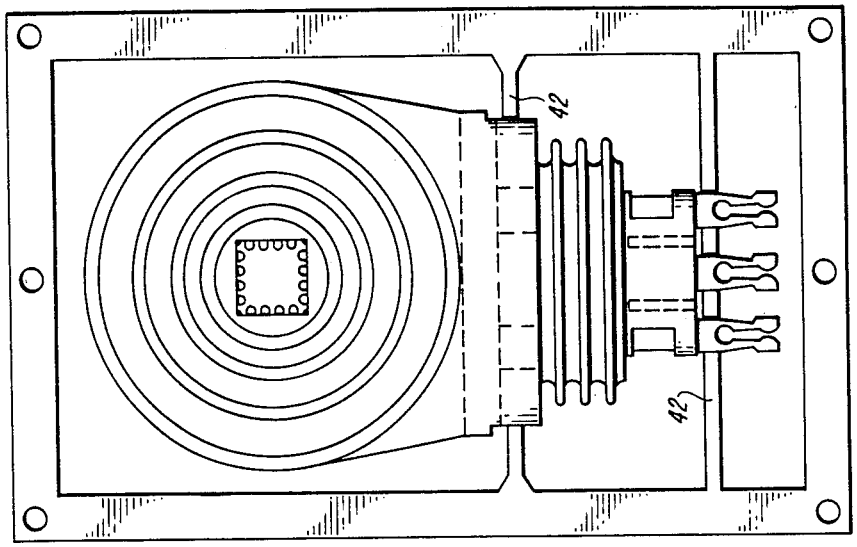
FIG. 6 is a bottom view of the housing of FIG. 1 showing the lead frame attached.
Figure 5:
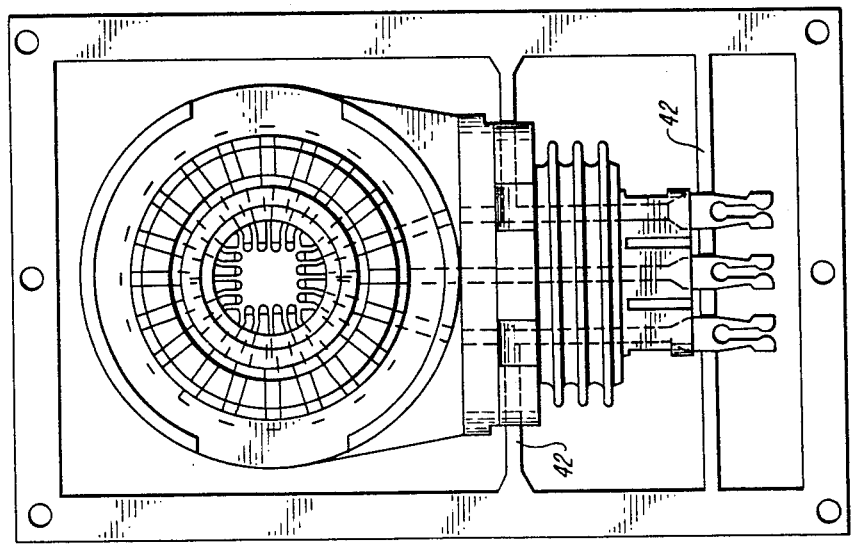
FIG. 5 is a top view of the housing of FIG. 1 showing the electrical lead frame attached.
Figure 7:
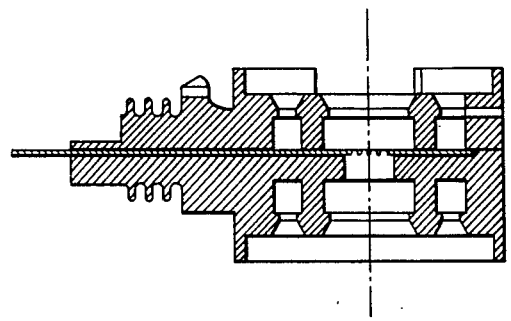
FIG. 7 is a sectional view taken along lines 7—7 of FIG. 5.
Figure 8:
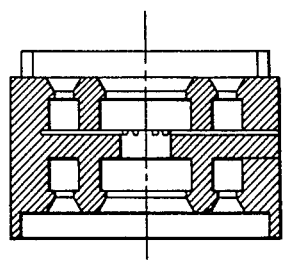
FIG. 8 is a sectional view taken along lines 8—8 of FIG. 5.

The electrical leads are preferably fabricated from a lead frame 40 (FIGS. 5 and 6) which is insert molded into the unitary housing 10 and which, after the molding operation, has the unwanted frame elements 42 severed to provide discrete external leads and contacts for electrical connection to the sensing element. The unwanted elements 42 of the lead frame are typically separated by the manufacturer after molding of the unitary housing. A sensing element such as a silicon pressure sensitive chip 16 is mounted on a mounting plate 46 and disposed in the housing cavity 12. The sensing element is connected to respective contacts 14 such as by wire bonds between the respective contacts and contact pads 48 of the sensing element. The other contacts 14 which are distinct from those contacts connected to the electrical leads are employed for programming of the sensing element by means of wire bonds or other suitable interconnections between selected contact pads of the sensing element and selected contacts 14. In essence, the contacts can serve as programmable jumpers for the sensing element.

As seen in FIG. 4, rigid plastic rings 52 such as thermoplastic polyester, can optionally be provided in the cavity and locked therein as shown to rigidize the integral rings 34, and to minimize the opportunity for movement of rings 34 such as can occur due to moisture or heat induced swelling and contraction.

Referring to FIG. 4, a pressure fitting 62 is attached to the housing and is in sealed engagement with the confronting surfaces 30 of rings 34 and periphery 26. The fitting includes a central portion 62 with a periphery cooperative with and latched to the confronting surfaces of rings 34. A port 64 outwardly extends from the fitting and can be coupled to a vacuum or positive pressure line. A plurality of ears 66 can be provided around the periphery of the fitting for mounting of the connector system to a mounting surface to maintain the fitting 62 and plate 46 in sealed position. Other mounting means can be engaged to suit the particular installation.

A mounting plate 46 is mounted on and sealed to the housing 10 and includes a cap surface 68 sealed to the peripheral surface 28 and ring surfaces 32, and a central area 60 having a periphery mateable with the confronting periphery of the sealing rings 34. The central area includes a mounting surface 72 on which the sensor chip is mounted in confronting relation to the contacts 24 which are electrically connected to corresponding contact pads 48 of the chip. The fitting 62 and the mounting plate 46 are formed of a suitable rigid material which can be a melt such as an aluminum alloy, or a rigid plastic such as thermoplastic polyester. The sealing surfaces of the pressure fitting and the mounting plate can have a coating such as Gel-Tek whic is a rubberized sticky silicon coating, to provide added sealing with the confronting surfaces. The lead frame can be of any suitable conductive material typically brass with gold plating on the contact ends.

Figure 3:
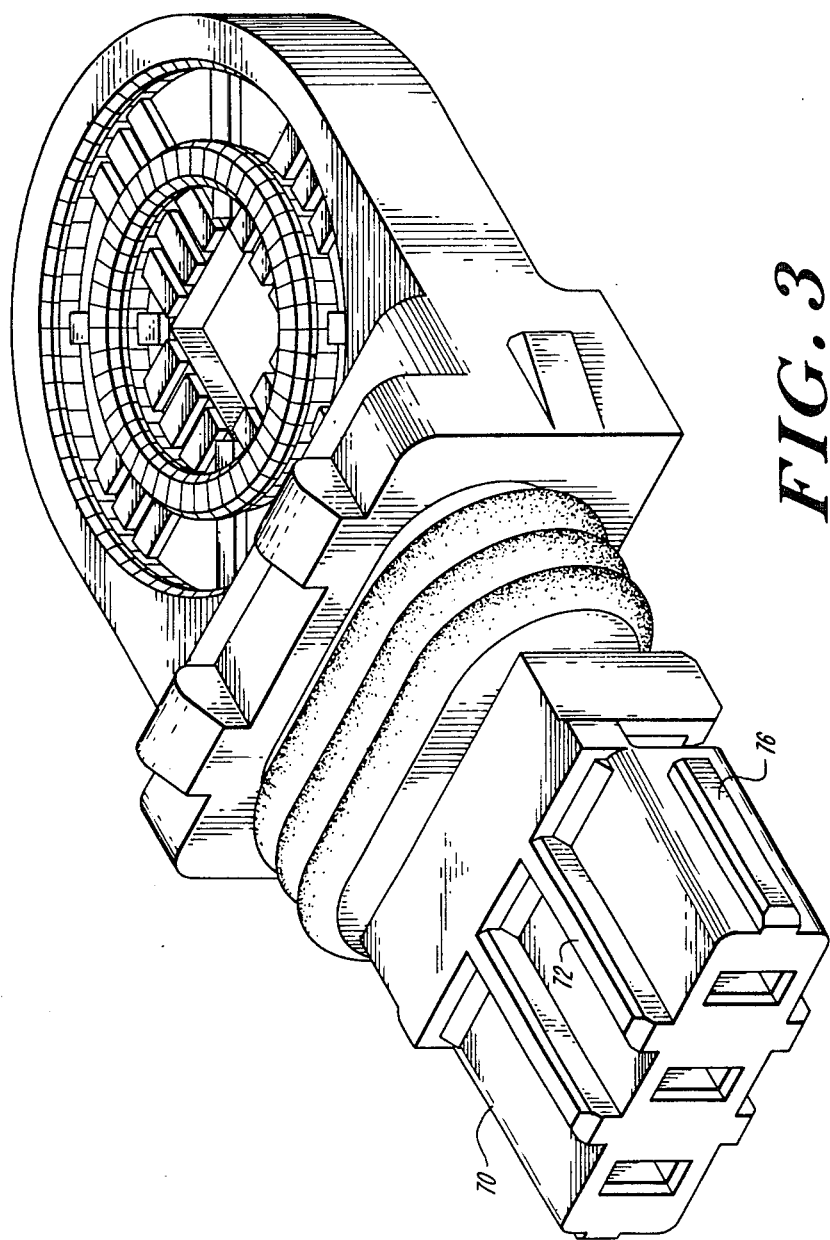
FIG. 3 is a pictorial view of the index housing attached to the connector of FIG. 1.

The connector housing 10 can be plugged into a cooperative connector housing and latched thereto by latch tabs 36. An index housing 70 can be affixed to the housing 10 as illustrated in FIG. 3 to serve as a uniquely indexed connector portion for mating with a similarly indexed connector housing. The specific indexing keys 72 can also serve to identify the particular type of sensing element contained within the housing 10. The index housing 70 has snap-lock arms 74 by which the index housing is retained on housing 10, and has polarization ridges 76 to permit proper interconnection with a mating connector.

The invention is not to be limited by what is shown and described except as indicated in the appended claims.

What is claimed is:

1. A pressure sensor connector system comprising:
    a unitary molded housing of elastomeric material having a unitary lead assembly molded therein and a cavity for containing a pressure sensing element;
    the unitary lead assembly having a plurality of leads each of integral construction each with a first portion external of the housing for connection to a mateable connector, a second portion confronting the cavity for connection to a sensing element disposed in the cavity, and an intermediate portion molded within the housing;
    a first integral seal unitarily molded with the housing and surrounding the external leads for sealing engagement with a mateable connector;
    a second integral seal unitarily molded with the housing and around the cavity for sealing engagement with a pressure fitting; and
    a pressure fitting in sealed engagement with the second integral seal and having a port for coupling the cavity to a source of pressure.

2. The connector system of claim 1 including a mounting plate in sealed engagement with the housing and having a surface disposed in the cavity for supporting a pressure sensing element.

3. A pressure sensor connector system comprising:
    a unitary housing of elastomeric material having a lead assembly molded therein and a cavity for containing a pressure sensing element, and having integral therewith:
    an upper ring surrounding the cavity and having a sealing surface;
    a lower ring surrounding the cavity, and having a sealing surface;
    a first peripheral surface coplanar with the upper ring sealing surface;
    a second peripheral surface coplanar with the lower ring sealing surface;
    the lead assembly having a plurality of leads external of the housing for connection to a mateable connector and a plurality of lead contacts confronting the cavity for connection to a sensing element disposed in the cavity;
    a pressure fitting in sealed engagement with the upper ring sealing surface and the first peripheral surface and having a port for coupling the cavity to a source of pressure;
    a mounting plate in sealed engagement with the lower ring sealing surface and the second peripheral surface and having a portion disposed in the cavity for supporting the sensing element.

4. The connector system of claim 3 including;
    an integral seal surrounding the external leads for sealing engagement with a mateable connector.

5. The connector system of claim 4 wherein the lead assembly is part of a lead frame barring sections removed prior to use.

6. The connector system of claim 4 including an index housing attachable to the unitary housing around the external leads and operative to provide mating with a correspondingly indexed connector.

7. The connector system of claim 4 including a sealing coating on the sealing surfaces of the unitary housing.

8. The connector system of claim 4 including first and second rigid rings disposed respectively around the upper and lower rings and operative to rigidize the upper and lower rings.

9. For use in a pressure sensor system, a unitary housing of elastomeric material having a lead assembly molded therein and a cavity for containing a pressure sensing element, and having integral therewith:
    an upper ring surrounding the cavity and having a sealing surface;
    a lower ring surrounding the cavity, and having a sealing surface;
    a first peripheral surface coplanar with the upper ring sealing surface;
    a second peripheral surface coplanar with the lower ring sealing surface;
    the lead assembly having a plurality of leads external of the housing for connection to a mateable connector and a plurality of lead contacts confronting the cavity for connection to a sensing element disposed in the cavity.

* * * * *